United States Patent Office 2,807,943
Patented Oct. 1, 1957

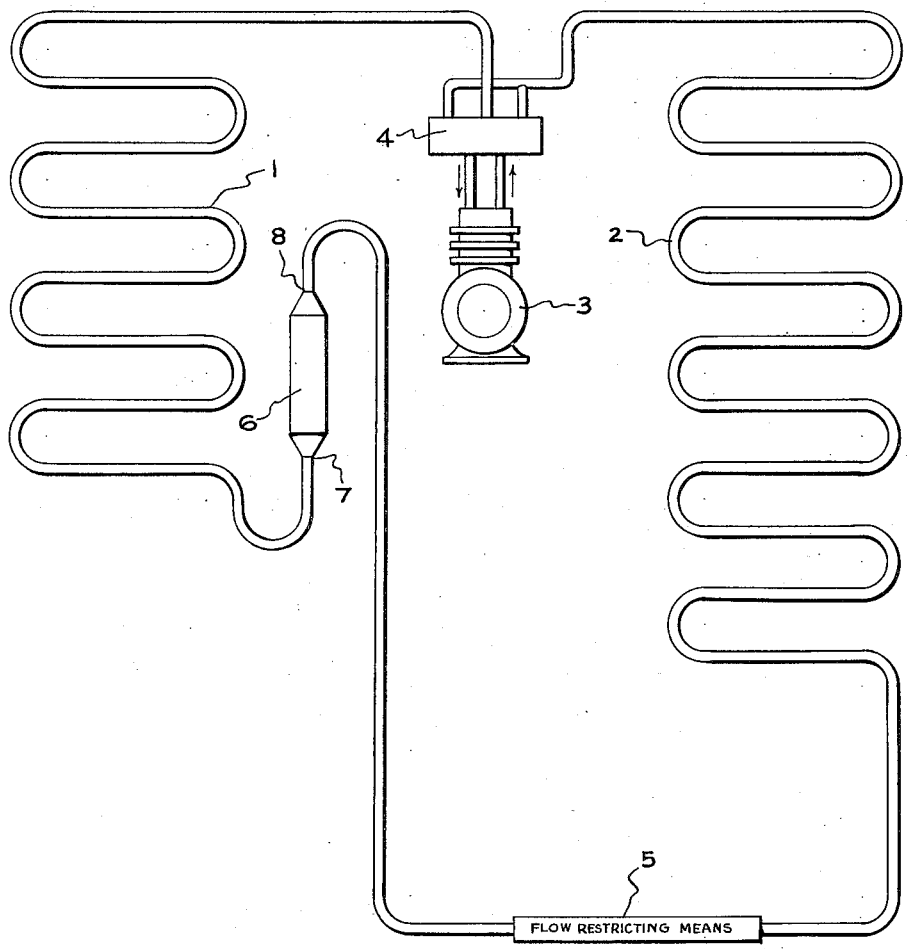
*INVENTORS*
DONALD W. LYNCH &
GEORGE PINTER
BY
THEIR ATTORNEY

2,807,943

HEAT PUMP INCLUDING MEANS FOR CONTROLLING EFFECTIVE REFRIGERANT CHARGE

Donald W. Lynch, West Caldwell, and George Pinter, Irvington, N. J., assignors to General Electric Company, a corporation of New York Application December 29, 1954, Serial No. 478,429

4 Claims. (Cl. 62—115)

The present invention relates to heat pumps and more particularly to a heat pump comprising a reversible refrigerant circuit including means for controlling the effective charge of refrigerant in the circuit.

A heat pump employed for cooling a dwelling or other structure in the summer and the heating thereof during the colder months essentially comprises a reversible refrigerant circuit including an indoor heat exchanger, an outdoor heat exchanger, compressor means for effecting the flow of refrigerant through the circuit and means for controlling the flow of refrigerant from one heat exchanger to the other and for effecting and maintaining a pressure differential between the two sides of the refrigerant circuit.

Until quite recently, most of the larger heat pumps employed for example for conditioning an entire dwelling, have included the conventional expansion valves rather than a fixed flow restrictor means of the capillary tube type for controlling the flow of refrigerant from the high pressure side of the refrigerant circuit to the low pressure side. The restriction of the use of capillary tubes to the small capacity refrigeration systems and heat pumps has been due primarily to the fact that the capillary tube has a limited ideal operating condition. Under load conditions different from the ideal one as for example when a capillary tube system is operated as a reversible circuit for both heating and cooling operations with the same refrigerant charge, under some of the operating conditions a considerable loss in efficiency of the system is noted.

Accordingly, it is a primary object of the present invention to provide a heat pump including a reversible refrigerant circuit comprising a fixed flow restricting means, and comprising also means for controlling the effective refrigerant charge in order that the circuit may operate at substantially maximum efficiency on either the heating or cooling cycle.

Another object of the invention is to provide a reversible refrigerant circuit including means for automatically changing the effective refrigerant charge upon reversal of the flow of refrigerant through the circuit.

Further objects and advantages of the invention will become apparent as the following description proceeds and the features of novelty which characterize the invention will be pointed out with particularity in the claims annexed to and forming part of this specification.

In carrying out the present invention, there is employed a heat pump including a reversible refrigerant circuit comprising an indoor heat exchanger, an outdoor heat exchanger and a fixed flow restricting means for controlling the flow of refrigerant from one of the heat exchangers to the other. Provided in the circuit between the indoor heat exchanger and the flow restricting means is a container adapted to store a predetermined volume or amount of condensed refrigerant during operation of the circuit on the heating cycle with the indoor coil or heat exchanger functioning as a condenser. This container is connected at its bottom or lower end to the indoor heat exchanger and adjacent its upper end to the flow restricting means so that during operation of the circuit on the heating cycle condensed refrigerant is stored in the container and during operation on the cooling cycle is discharged through the indoor coil into the circuit to become part of the effective refrigerant charge in the system.

For a better understanding of the invention, reference may be had to the accompanying drawing in which the single figure is a diagrammatic illustration of a reverse cycle refrigeration circuit embodying the present invention.

Referring now to the drawing, the heat pump disclosed therein comprises an indoor heat exchanger or coil 1 and an outdoor heat exchanger or coil 2 which ordinarily is somewhat larger than the indoor heat exchanger 1. Means for conducting refrigerant from one of the two heat exchangers to the other includes a compressor 3 and a reversing valve 4 while a pressure differential between the two coils is maintained by a fixed flow restricting means 5. The fixed flow restricting means may be a single capillary tube or a plurality of capillary tubes which if desired may be arranged to provide a greater rate of flow of refrigerant through the restricting means in one direction than in the other and through which the flow may or may not be controlled by any additional means.

Intermediate the flow restricting means 5 and the indoor heat exchanger 1 is a container 6 having its lower end 7 connected to the indoor heat exchanger 1 and its upper end 8 connected to the flow restricting means. It will be seen that the indoor coil 1, the container 6, the compressor 3, the valve 4 and the flow restricting means 5 and the outdoor coil 2 form a closed or hermetic system through which refrigerant may be caused to flow in either direction by a reversal of the valve means 4. During operation of the heat pump of this type on the cooling cycle, the operating characteristics of the system are such that for optimum performance a larger charge of refrigerant is required than when the system is operating on the heating cycle.

The container 6, serially connected into the refrigerant circuit between the indoor heat exchanger and the flow restricting means provides means for changing the effective refrigerant charge in the circuit when the heat pump is changed over from operation on the heating cycle in which the indoor heat exchanger 1 functions as a condenser to the cooling cycle in which the indoor heat exchanger 1 functions as an evaporator. The entire container 6 which may be considered a refrigerant positioner is located at about the same elevation as the lower end of the indoor heat exchanger 1, that is, the outlet end of this heat exchanger when it functions as a condenser. The purposes and advantages of the container or refrigerant positioner 6 will be more apparent from a consideration of the operation of the heat pump on each of these two operating cycles.

When the system is operating on the cooling cycle compressed refrigerant from the compressor 3 is directed by the reversing valve 4 to the outdoor heat exchanger 2 in which the refrigerant is condensed. Liquid refrigerant from the outdoor heat exchanger 2 flows through the flow restricting means 5 to the indoor heat exchanger 1 which is functioning as an evaporator. In this heat exchanger, the refrigerant is evaporated by absorbing heat from the surrounding atmosphere whereby the air in the dwelling or other structure being conditioned by the heat pump is cooled. The flow restricting means 5 provides the rate of flow of refrigerant for economic operation of the system on the cooling cycle.

During the operation of the refrigerant circuit on the cooling cycle, it will be noted that low pressure refrigerant is introduced into the container 6 from the flow restricting means 5. It is characteristic of refrigerants that while passing through a throttling device, a certain portion flashes into gaseous form so that the refrigerant reaching the container 6 is in the form of a mixture of liquid and gaseous refrigerant. It is also a characteristic of refrigerants in such two phase condition that the density of such mixtures are usually considerably lower than that of the liquid refrigerant for which reason the positioner 6 does not contain or store any substantial amount or weight of refrigerant as compared to when it is filled with liquid refrigerant only on heating operation.

When the circuit is operated on the heating cycle, the compressed refrigerant from compressor 3 is conducted through the reversing valve 4 to the indoor coil 1 where the heat liberated during condensation heats the space being conditioned. The condensed refrigerant from the indoor heat exchanger collects in the container or positioner 6 until it is filled with liquid refrigerant. Thereafter the condensed refrigerant flowing from container 6 passes on through the flow restricting means 5 into the outdoor heat exchanger 2 which on the heating cycle is functioning as an evaporator. During operation of the refrigerant circuit on the heating cycle the flow restricting means is controlling the refrigerant flow for economic operation of the system.

The capacity of the container 6 is such that the difference between the amount of liquefied or condensed refrigerant accumulating in this container during operation of the circuit on the heating cycle minus the amount of gaseous and liquid refrigerant contained in the container 6 during operation of the system on the cooling cycle equals the difference between the most effective charge of refrigerant on the cooling cycle and the most effective charge of refrigerant on the heating cycle. In other words, the container or positioner 6 is so designed and positioned that it will store an amount of refrigerant during operation of the circuit on the heating cycle which is equal to the difference between the amount of refrigerant required for economic heating operation and for economic cooling operation of the system.

It will be seen therefore that there has been provided a completely automatic means for varying the effective charge of refrigerant in a reversible refrigerant circuit as it is reversed from operation on one cycle to operation on the other cycle. Also when the circuit is again returned to the operation on the first cycle, the refrigerant stored in the container 6 automatically adjusts itself to the requirements of the system for economic operation. Furthermore with the container 6 positioned as shown in the drawing so that it is connected to the lower end of the indoor heat exchanger 1, the accumulation and storage of the desired amount of liquid or condensed refrigerant in the container 6 during heating cycle operation is assured regardless of the operating conditions existing in the heat pump system. In other words, whether the system is operating in such a manner that the refrigerant leaves the indoor heat exchanger 1 as a liquid with no sub-cooling or in a sub-cooled condition, liquid refrigerant will collect in the container 6 until it becomes filled thereby assuring a decrease in the effective charge during operation of the heat pump on the heating cycle.

While there has been shown and described a specific embodiment of the present invention, it is to be understood that the invention is not limited thereto and it is intended, by the appended claims, to cover all modifications within the spirit and scope of the invention.

What we claim as new and desire to secure by Letters Patent of the United States is:

1. A heat pump comprising an indoor heat exchanger, flow restricting means and an outdoor heat exchanger serially connected in a closed refrigerant circuit, said flow restricting means in said circuit controlling the flow of refrigerant from each of said exchangers to the other, compressor and valve means in said circuit for effecting flow of refrigerant through said circuit in either direction whereby said indoor heat exchanger functions either as an evaporator or as a condenser, a charge of refrigerant in said circuit adapted to obtain efficient operation thereof when said indoor heat exchanger functions as a condenser and a refrigerant container serially connected in said circuit between said indoor heat exchanger and said restricting means with the connection thereof to said indoor exchanger being at the lower end thereof, said container storing a portion of said charge as condensed refrigerant only during operation of said system with the indoor heat exchanger as a condenser.

2. A heat pump comprising a reversible refrigerant circuit including an indoor heat exchanger, an outdoor heat exchanger, and a capillary tube flow restricting means between said heat exchangers controlling the flow of refrigerant in said circuit in either direction, the characteristics of said circuit being such that for maximum efficiency the optimum charge of refrigerant required when the indoor exchanger functions as an evaporator is greater than the optimum charge when it operates as a condenser, a charge of refrigerant in said circuit equal to that required for efficient operation of the circuit with said indoor exchanger as an evaporator, a container having a refrigerant storage capacity substantially equal to the difference in said optimum charges, said container being connected in said circuit between said indoor exchanger and said restricting means, the connection with said indoor exchanger being at the bottom of said container and the connection with said restrictor means being adjacent the top of said container whereby the volume of said container is filled with condensed refrigerant when the heat pump is operating with the indoor exchanger as the condenser and with substantially vaporized refrigerant when said indoor exchanger functions as the evaporator.

3. A heat pump comprising a reversible refrigerant circuit including an indoor heat exchanger, an outdoor heat exchanger, fixed flow restricting means between said heat exchangers controlling the flow of refrigerant in said circuit in either direction, the characteristics of said circuit being such that for maximum efficiency the optimum charge of refrigerant required when the indoor exchanger functions as an evaporator is greater than the optimum charge when it operates as a condenser, a charge of refrigerant in said circuit equal to that required for efficient operation of the circuit with said indoor exchanger as an evaporator, a container having a refrigerant storage capacity substantially equal to the difference of said optimum charges, said container being connected in said circuit between said indoor exchanger and said restricting means, the connection with said indoor exchanger being at the bottom of said container and the connection with said restrictor means being adjacent the top of said container, said container being positioned at about the same elevation as the lower end of said indoor exchanger and being adapted to store a portion of the refrigerant charge as condensed refrigerant when said indoor exchanger functions as a condenser.

4. A heat pump comprising a reversible cycle refrigerant circuit including an indoor heat exchanger, fixed flow restricting means, an outdoor heat exchanger and compressor means in closed series connection, said heat exchangers being connected at their lower ends to said restrictor means and at their upper ends to said compressor means, said compressor means including valve means for reversing the flow of refrigerant through said circuit whereby said circuit can be operated either on a heating cycle with the indoor exchanger functioning as a condenser or on a cooling cycle with the indoor exchanger functioning as an evaporator, said circuit requiring a larger charge of refrigerant for efficient operation on the cooling cycle than on the heating cycle, a charge of refrigerant in said circuit substantially equal to that necessary for efficient operation of the circuit on the cooling cycle, and means for decreasing the effective charge of refrigerant during operation of said circuit on the heating cycle, said means including a container serially connected also into said circuit between said indoor exchanger and said restricting means, and having its lower end connected to the lower end of said indoor exchanger and its upper end connected to said restrictor means whereby liquid refrigerant is stored in said container during operation of the circuit on the heating cycle.

References Cited in the file of this patent

UNITED STATES PATENTS

| | | |
|---|---|---|
| 2,276,814 | Zwickl | Mar. 17, 1942 |
| 2,525,560 | Pabst | Oct. 10, 1950 |
| 2,572,356 | Krueger | Oct. 23, 1951 |
| 2,589,855 | Pabst | Mar. 18, 1952 |
| 2,627,730 | Zearfoss | Feb. 10, 1953 |